United States Patent [19]

Klingensmith

[11] Patent Number: 4,916,208

[45] Date of Patent: Apr. 10, 1990

[54] NOVEL POLYMERS

[75] Inventor: George B. Klingensmith, Houston, Tex.

[73] Assignee: Shell Oil Company, Houston, Tex.

[21] Appl. No.: 323,724

[22] Filed: Mar. 15, 1989

Related U.S. Application Data

[63] Continuation-in-part of Ser. No. 134,677, Dec. 18, 1987, Pat. No. 4,822,871.

[51] Int. Cl.$^4$ .............................................. C08G 67/02
[52] U.S. Cl. ................... 528/392; 528/493; 525/191; 525/240; 525/242; 525/245
[58] Field of Search ............... 528/392, 493; 525/191, 525/240, 242, 245

[56] References Cited

U.S. PATENT DOCUMENTS

| | | | |
|---|---|---|---|
| 3,694,412 | 9/1972 | Nozaki | 260/63 CQ |
| 4,798,884 | 1/1989 | Brons et al. | 528/491 |
| 4,816,514 | 3/1989 | Lutz | 525/55 |
| 4,818,811 | 4/1989 | Drent | 528/392 |
| 4,820,802 | 4/1989 | Drent et al. | 528/392 |
| 4,822,871 | 4/1989 | Klingensmith | 528/392 |
| 4,824,934 | 4/1989 | van Broekhoven et al. | 528/392 |
| 4,824,935 | 4/1989 | van Broekhoven et al. | 528/392 |
| 4,831,113 | 5/1989 | van Broekhoven et al. | 528/392 |
| 4,831,114 | 5/1989 | Drent | 528/392 |
| 4,835,250 | 5/1989 | Drent | 528/392 |

FOREIGN PATENT DOCUMENTS

| | | |
|---|---|---|
| 121965 | 3/1984 | European Pat. Off. . |
| 181014 | 5/1986 | European Pat. Off. . |
| 213671 | 8/1986 | European Pat. Off. . |
| 257663 | 5/1987 | European Pat. Off. . |

*Primary Examiner*—Morton Foelak
*Assistant Examiner*—S. A. Acquah
*Attorney, Agent, or Firm*—Dean F. Vance

[57] ABSTRACT

Novel, linear alternating polymers of carbon monoxide and at least one ethylenically unsaturated hydrocarbon have a high degree of monomeric unit purity. The polymers, produced with a catalyst composition formed from preformed palladium trifluoroacetate and a bidentate phosphorous ligand, exhibit improved thermal stability and enhanced crystallinity and crystallizability.

11 Claims, No Drawings

NOVEL POLYMERS

This application is a continuation-in-part of U.S. application Ser. No. 134,677, filed Dec. 18, 1987 now U.S. Pat. No. 4,822,871.

SUMMARY OF THE INVENTION

This invention relates to certain novel linear alternating polymers of carbon monoxide and at least one ethylenically unsaturated hydrocarbon. More particularly, the invention relates to such polymers, produced in a reaction environment substantially free from strong acid, which are characterized by a high degree of monomeric unit purity.

BACKGROUND OF THE INVENTION

The class of polymers of carbon monoxide and olefin(s) has been known for a number of years. Brubaker, U.S. Pat. No. 2,495,286, produced such polymers in the presence of free radical initiators, e.g., peroxy compounds. U.K. 1,081,304 produced similar polymers of higher carbon monoxide content in the presence of alkylphosphine complexes of palladium salts as catalyst. Nozaki extended the process through the use of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, for example copolymers of carbon monoxide and ethylene or terpolymers of carbon monoxide, ethylene and propylene, have become of greater interest, in part because of the greater availability of the polymers. These polymers have been shown to be of the general formula

wherein A is the moiety of ethylenically unsaturated hydrocarbon polymerized through the ethylenic unsaturation. For example, when the ethylenically unsaturated hydrocarbon is ethylene the polymer is represented by the repeating formula

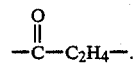

If propylene is also present in the reaction mixture, the polymer will additionally have units of

found randomly throughout the polymer chain. The general process for the preparation of the polymers is illustrated by a number of published European Patent applications including 121,965 and 181,014. This process generally involves a catalyst composition formed from a compound of the Group VIII metals palladium, cobalt or nickel, the anion of a non-hydrohalogenic acid having a pKa below 2 and a bidentate ligand of phosphorous, arsenic or antimony.

The resulting polymers are relatively high molecular weight thermoplastics having utility in the production by methods conventional for thermoplastics of shaped articles such as containers for food and drink or parts for the automotive industry. The polymers have relatively high melting points, generally over 175° C., frequently over 210° C., depending upon the molecular weight and chemical nature of the polymer.

The polymers are further characterized by a high degree of linearity and alternating structure. There is, however, a certain degree of irregularities or defects in the regular pattern of alternating carbonyl and alkylene groups. These defects are thought to be responsible for a lowering of crystallinity of the polymers accompanied by, on occasion, weight loss of the polymer upon heating to the temperatures near or above the melting point of the polymer which are normally associated with methods for processing of thermoplastic polymers, e.g., injection molding or extrusion. It would be of advantage to provide linear alternating polymers of carbon monoxide and at least one ethylenic hydrocarbon which have relatively few irregularities in the polymer chain and are therefore of enhanced crystallinity.

DESCRIPTION OF THE INVENTION

The polymers of the invention, broadly, are linear alternating polymers of carbon monoxide and at least one ethylenically unsaturated hydrocarbon of the type often referred to as polyketones or polyketone polymers. The polymers are produced in a reaction environment substantially free of acid and in part as a result thereof, the polymers have relatively few defects or irregularities in the polymer chain and a relatively high degree of crystallinity. In a linear alternating polyketone polymer completely free from polymer chain defects each monomeric unit will be of the type

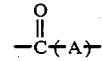

wherein A is the moiety of a single ethylenically unsaturated hydrocarbon in the case of a copolymer or, in the case of a terpolymer, the moiety of one or the other of the two different ethylenically unsaturated hydrocarbons. In such defect-free polymers, the monomeric unit purity is 100%, that is, each monomeric unit is of the type

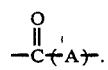

However, in practice there are defects in the polymer chain of virtually any polymer chain of substantial length so that the monomeric unit purity will almost certainly average less than 100%. It is generally acknowledged that the presence of defects or irregularities in the polymer chain results in a lowering of the polymeric crystallinity and the melting point of the polymer. The novel polymers of the invention have relatively few defects or irregularities in the polymeric chain. This higher degree of monomeric unit purity results, inter alia, in enhanced melt stability and crystallinity. The novel polyketone polymers of the invention have a monomeric unit purity of over 99.5%.

The ethylenically unsaturated hydrocarbons which are useful as precursors of the polyketones have up to 20 carbon atoms inclusive, preferably up to 10 carbon atoms, and are aliphatic including ethylene and other alpha-olefins such as propylene, 1-butene, isobutylene, 1-hexane, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. Preferred polyketone polymers are copolymers of carbon monoxide, ethylene and a second alpha-olefin, of at least 3 carbon atoms, particularly propylene.

The structure of the preferred polymers is that of a linear alternating polymer of carbon monoxide and ethylenically unsaturated hydrocarbon. When terpolymers of carbon monoxide, ethylene and a second hydrocarbon are produced there will be at least two units incorporating a moiety of ethylene for each unit incorporating a moiety of the second hydrocarbon. Preferably, there will be from about 10 units to about 100 units incorporating a moiety of ethylene for each unit incorporating the second hydrocarbon. The polymer chain is therefore represented by the repeating formula

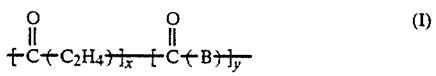  (I)

wherein B represents the moiety of a second alpha-olefin of at least 3 carbon atoms polymerized through the ethylenic unsaturation thereof. The

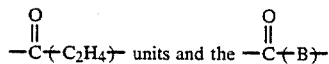

units are found randomly throughout the polymer chain and the ratio of y:x is no more than 0.5. In the modification of the invention which produces copolymers of carbon monoxide and hydrocarbon without the presence of a second hydrocarbon, the polymers are represented by the above formula (I) where y is 0. When y is other than 0, i.e., terpolymers are produced, ratios of y:x from about 0.01 to about 0.1 are preferred. The end groups or "caps" of the polymer chain will depend upon what materials are present during the production of the polymer and how and whether the polymer has been purified. The precise nature of the end groups is of little apparent significance so far as the overall properties of the polymer are concerned so that the polymer is fairly represented by the polymer chain depicted above.

Of particular interest are the polymers of molecular weight from about 1,000 to about 200,000, particularly those of molecular weight from about 10,000 to about 50,000. The physical properties of the polymer will depend upon the molecular weight, whether the polymer is a copolymer or a terpolymer and, in the case of terpolymers, the relative proportion of the second hydrocarbon present. Typical melting points of such polymers are from about 175° C. to about 300° C., more frequently from about 210° C. to about 270° C.

The method of producing the polymers which is conventionally employed is to contact the carbon monoxide and hydrocarbon(s) with a catalyst composition formed from a palladium salt, preferably a palladium carboxylate such as palladium acetate, the anion of a non-hydrohalogenic acid having a pKa below about 6, preferably below 2, e.g., the anion of trifluoroacetic acid or p-toluenesulfonic acid, and a bidentate ligand of phosphorus of defined structure. Such a process is illustrated by copending U.S. patent application Ser. No. 596,788, filed Sept. 18, 1986, and Ser. No. 935,431, filed Nov. 14, 1986 as well as the above two published European Patent Applications. The processes generally employ a stoichiometric excess of anion provided as the acid over the palladium compound and typically a ratio of anion to palladium of about 20:1. Although the above two copending applications do disclose that the palladium salt and the anion of the catalyst composition is suitably added as a single compound such as palladium p-toluenesulfonate or the acetonitrile complex thereof, rather than being provided as, for example, palladium acetate and an excess of the anion of the non-hydrohalogenic acid, there are no stated advantages in the provision of the palladium and anion catalyst composition precursors as a single compound.

When the polyketone polymer produced by the conventional methods, e.g., with an excess of acid, is analyzed carefully it is found that a small proportion of the monomeric units are not in the form of

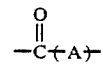

units and are therefore irregularities or defects in the polymer chain. When the polymer is produced, for example, in the presence of an alkanol which is the preferred reaction diluent, the alkanol is thought to undergo an acid-catalyzed reaction with a small proportion of the carbonyl groups of the polymer to form ketals. For example, polymer produced in the presence of methanol and an excess of acid will contain a small percentage of dimethyl ketal moieties within a portion of the monomeric units of the polymer chain instead of carbonyl groups. In other cases with the other reaction diluents, small proportions of cyclic structures of the furan general type are present as monomeric unit impurities, perhaps as a hemiketal. The proportion of these polymer chain defects is rather small, e.g., from 0.5% mol to about 2.3% mol, based on total monomeric units present, so that the above formula (I) fairly depicts the polymer chain. The presence of such defects, however, results in an observable decrease of crystallinity in the polymer product.

The polymers of the present invention are produced in the substantial absence of added acid in the presence of a catalyst composition formed from preformed palladium trifluoroacetate and a bidentate phosphorus ligand as defined below. Use of the catalyst composition of the invention results in the production of a polymer having a monomeric unit purity above 99.5% by mol, based on total monomeric units. Such polymers exhibit improved thermal stability, a generally reduced weight loss at elevated temperatures and enhanced crystallinity and crystallizability.

The phosphine ligand of the process of the invention is a bis(diphosphino)alkane wherein each monovalent phosphorous substituent is an aromatic radical of up to 10 carbon atoms, inclusive. The preferred ligands are represented by the formula

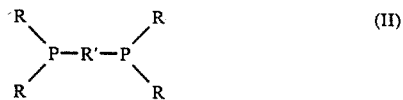 (II)

wherein R independently is aryl including alkylaryl and is hydrocarbyl or non-hydrocarbyl wherein any non-hydrocarbyl substituents are alkoxy. Illustrative R groups are therefore phenyl, p-tolyl, p-methoxyphenyl, p-propylphenyl, o-methoxyphenyl, 2,4-dimethoxyphenyl, o-ethoxyphenyl and m-butoxyphenyl. The R groups are the same or are different but in the preferred bidentate phosphine ligands the R groups are the same and are phenyl or phenyl substituted with an alkoxy group in a position ortho to the phosphorus. The R' group is a divalent bridging group of from 2 to 10 carbon atoms inclusive and preferably contains from 2 to 4 carbon atoms in the bridge connecting the phosphorus atoms. The preferred R' group is a 1,3-propylene or trimethylene group, i.e., the —$CH_2$—$CH_2$—$CH_2$— group.

Illustrative of preferred bidentate phosphorous ligands are 1,3-bis[di(2-methoxyphenyl)phosphino]propane, 1,3-bis[di(2,4-diethoxyphenyl)phosphino]propane and 1,3-bis(diphenylphosphino)propane. The 1,3-bis(diphenylphosphino)propane ligand is particularly preferred.

The bidentate phosphorus ligand is generally employed in a quantity from about 0.1 mol to about 5 mol per mol of palladium trifluoroacetate, but preferably in a quantity of from about 0.5 mol to about 1.5 mol per mol of palladium trifluoroacetate. The quantity of the catalyst composition to be utilized is a catalytic quantity. Amounts of catalyst composition are typically sufficient to provide from about $1 \times 10^{-7}$ mol to about $1 \times 10^{-3}$ mol of palladium per mol of unsaturated hydrocarbon to be polymerized, preferably from about $1 \times 10^{-6}$ mol to about $1 \times 10^{-4}$ mol of palladium per mol of ethylenically unsaturated hydrocarbon. The molar ratio of ethylenically unsaturated hydrocarbon to carbon monoxide to be utilized in the polymerization mixture will be from about 10:1 to about 1:5 but preferably will be from about 5:1 to about 1:2.

The reactants and catalyst composition are contacted in a reactor such as an autoclave under polyermization conditions in the liquid phase in the presence of an inert reaction diluent. The precise nature of the reactor is not critical, although best results are obtained if reactant-/catalyst composition contact can be maintained as by shaking or stirring. The reaction diluent is an inert diluent such as an alkanol, e.g., methanol or ethanol, but is also suitably a ketone such as acetone or methyl ethyl ketone. Typical polymerization conditions include a reaction temperature from about 20° C. to about 115° C., preferably from about 40° C. to about 110° C. Reaction pressures are usefully from about 100 psi to about 3000 psi with reaction pressures from about 600 psi to about 1500 psi being preferred.

Subsequent to reaction, the polymer product is recovered by conventional means including filtration or decantation. The polymer product may contain residues of the catalyst composition which are removed, if desired, by treatment with a solvent which is selective for the catalyst residues.

The polymer product is a linear alternating polymer of carbon monoxide and at least one ethylenically unsaturated hydrocarbon having a monomeric unit purity of at least 99.5%. Such polymers, in at least many instances, are characterized by a relatively high heat stability as evidenced by a relatively low weight loss when being maintained at elevated temperatures. The property of heat stability is a function of a number of variables including molecular weight, but when a polymer of the invention is compared with a polymer of comparable molecular weight produced by the preferred methods of published European Patent Application 181,014, for example, the present polymers will exhibit an increased heat stability as evidenced by a reduced weight loss on heating. This relationship is particularly evident for polymers produced in the presence of alkanol, e.g., methanol, reaction diluent.

The polymer product also shows a relatively high crystallinity as evidenced by differential scanning calorimeter (DSC) measurements of melting point and crystallization temperatures. Typically, the melting point, $T_m$, will be higher than the crystallization temperature, $T_c$. Although a number of factors influence the melting point and crystallization temperature, these values are particularly influenced by the crystallinity and the crystallizability of the polymer. In general, when comparing similar polyketone polymers of comparable molecular weight, the higher the melting point and the higher the crystallization temperature the greater the crystallinity and crystallizability of the polymer. The same relationship is also observed for the heats of melting (H) and the heats of crystallization.

The polymers of the invention typically show an equivalent or higher $T_m$ and a higher $T_c$ is DSC measurements than polymers of comparable molecular weight produced by conventional methods. The polymers of the present invention also shown an equivalent or higher heat of fusion (H) and a higher heat of crystallization than polyketone polymers of comparable molecular weight produced by conventional methods. The enhanced crystallinity and crystallizability of the polymers of the present invention, as compared to conventionally produced polyketones, is also evident in repeated heating and cooling DSC cycles.

The polyketone polymers of the present invention are in general premium thermoplastics of established utility. The polymer of the present invention has particular utility in applications where the polymer processing is likely to involve temperatures at or near the melting point of the polymer. Such applications include the production of containers for food and drink as by thermoforming, the production of shaped parts for the automotive industry produced as by injection molding and the production of wires and cables produced as by extrusion.

The invention is further illustrated by the following Comparative Examples (not of the invention) and the Illustrative Embodiments which should not be construed as limiting the invention.

COMPARATIVE EXAMPLE I

A sample of a linear alternating copolymer of carbon monoxide and ethylene was produced by a conventional method employing a catalyst composition formed from palladium acetate, trifluoroacetic acid and 1,3-bis(diphenylphosphino)propane. The molar ratio of trifluoroacetic acid to palladium acetate was 20:1 and the molar ratio of the diphosphine to palladium acetate was 1.2:1. In a typical experiment, 0.046 mmol of palladium acetate, 0.92 mmol of trifluoroacetic acid and 0.055 mmol of 1,3-bis(diphenylphosphino)propane in 27.6 ml of methanol was charged to a stirred autoclave containing methanol as reaction diluent. Carbon monoxide and ethylene were introduced in a molar ratio of 2:1 and the reactor and contents were maintained at 65° C. and 725 psi for 23 hours. The reactor was then cooled and the pressure released. The polymer product was recovered from the product mixture by filtration, washed with methanol and dried in vacuo. This product, termed "Sample A", had a limiting viscosity number (LVN) of 2.65 as measured in hexafluoroisopropanol at 100° C.

ILLUSTRATIVE EMBODIMENT I

Samples of a linear alternating copolymer of carbon monoxide and ethylene were produced by exploying a catalyst composition formed from preformed palladium trifluoroacetate and 1,3-bis(diphenylphosphino)propane. The molar ratio of the diphosphine to the palladium compound was 1.2:1. In a typical experiment, 0.046 mmol of palladium trifluoroacetate and 0.055 mmol of 1,3-bis(diphenylphosphino)propane in 27.6 ml of methanol were introduced into a stirred autoclave containing methanol as the reaction diluent. Carbon monoxide and ethylene were added in a 2:1 molar ratio. The reactor and contents were maintained for 16 hours at 55° C. and 950 psi. The reactor was then cooled and the pressure released. The polymer product was removed by filtration, washed with methanol and dried in vacuo. This sample, termed "Sample B", had a LVN of 2.65 as measured at 100° C. in hexafluoroisopropanol.

ILLUSTRATIVE EMBODIMENT II

The samples A and B as produced above were subjected to isothermal gravametric analysis (TGA) to determine stability in air and also in nitrogen under conditions of elevated temperature. In these determinations a DuPont 9900 instrument was used. The samples were heated rapidly to 210° C. in air and also in nitrogen and the weights of the samples were determined as a function of time over a period of two hours. The results of the determinations are shown in Table I wherein Samples A and B were produced according to the above procedures and Sampes $B_1$ and $B_2$ were produced according to the general procedure of Illustrative Embodiment I.

TABLE I

| Sample | Loss in Air %/hr | Loss in $N_2$ %/hr | Loss in Air Total, % | Loss in $N_2$ Total, % |
|---|---|---|---|---|
| A | 0.023 | 0.0033 | 8.01 | 5.09 |
| A | 0.024 | 0.0029 | 8.31 | 3.45 |
| B | 0.0047 | 0.00093 | 2.98 | 1.52 |
| $B_1$ | 0.0064 | 0.0018 | 2.94 | 3.15 |
| $B_2$ | 0.0090 | 0.0013 | 5.80 | 3.28 |

ILLUSTRATIVE EMBODIMENT III

Meassurements of melting points ($T_m$) and crystallization temperatures ($T_c$) or alternatively heats of melting (H) and heats of crystallization (C), for the polymer samples A and B were made by the use of a Perkin-Elmer DSC 7 differential scanning calorimeter which employs samples of polymer in sealed pan containers. The pan and contents are heated at a controlled rate, typically 20° C./minute, until the sample has ($T_{m1}$ and $H_1$) melted. The pan and contents are then cooled until the sample has solidified ($T_{c1}$ and $C_1$) and then heated, past a second melting point ($T_{m2}$ and $H_2$), to 285° C. at which temperature the sample is maintained for 10 minutes. The pan and contents are then cooled until the sample has solidified a second time ($T_{x2}$ and $C_2$). The melting and crystallization temperatures are defined as the temperatures at which the heat flow reaches a maximum (for melting) or a minimum (for crystallization). The heats of melting and crystallization can be obtained by calculation from the DSC data.

The smaller the difference between the first and second heats of melting, the greater the degree of retained crystallinity. The same relationship is true for the first and second heats of crystallization. The higher the degree of retained crystallinity the better the melt stability of the polymer.

The results of the DSC measurements for Samples A and B are shown in Table II. In Table II, the temperatures are measured in °C. and the heats are measured in cal/g.

TABLE II

| Sample | $T_m{}^1$ | $T_c{}^1$ | $T_m{}^2$ | $T_c{}^2$ | $H_1$ | $H_2$ | $C_1$ | $C_2$ |
|---|---|---|---|---|---|---|---|---|
| B | 260.8 | 198.9 | 246.7 | 180.0 | 36.6 | 30.0 | 24.2 | 18.0 |
| A | 251.9 | 184.8 | 230.0 | 156.9 | 37.4 | 23.7 | 19.9 | 12.5 |

COMPARATIVE EXAMPLE II

By procedures similar to that of Comparative Example I, a series of linear alternating copolymers of carbon monoxide and ethylene and linear alternating terpolymers of carbon monoxide, ethylene and propylene are produced. Samples of the polymers, both copolymers and terpolymers, were dissolved in hexafluoroisopropanol (HFIPA), one of the few solvents in which the polymers are substantially soluble.

The solutions of the samples were analyzed by $^{13}$C-NMR methods conventional for such polymers. The presence of a resonance band at 48.6 ppm was indicative of methyl ketal ($CH_3O$—) groups being present. The presence of methanol, not an impurity from the preparation of polymer, was also detected, likely caused by hydrolysis of a ketal group by water absorbed by the HFIPA which is very hygroscopic. These data indicate the presence within the polymer chain of monomeric units containing a dimethyl ketal moiety rather than a carbonyl group. In the samples tested, a minimum of 0.5% by mol of the monomeric units had a dimethyl ketal moiety present and the average percentage of monomeric units with a dimethyl ketal moiety was 1.3% mole.

ILLUSTRATIVE EMBODIMENT IV

Samples of polyketone polymers, both copolymers of carbon monoxide and ethylene and terpolymers of carbon monoxide, ethylene and propylene were made by the general procedure of Illustrative Embodiment I. The samples were analyzed by the procedure described in Comparative Example II. In no case was the percentage of monomeric units having a dimethyl ketal moiety found to be as high as 0.5% mol.

What is claimed is:

1. A linear alternating polymer of carbon monoxide and at least one ethylenically unsaturated hydrocarbon having a monomeric unit purity of over 99.5% by mol.

2. The polymer of claim 1 represented by the repeating formula

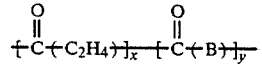

wherein B is the moiety of an alpha-olefin of at least 3 carbon atoms polymerized through the ethylenic unsaturation thereof, and the ratio of y:x is no more than 0.5.

3. The polymer of claim 2 wherein y is 0.

4. The polymer of claim 3 wherein a portion of the monomeric units contain dimethyl ketal moieties.

5. The polymer of claim 2 wherein the ratio of y:x is from about 0.01 to about 0.1.

6. The polymer of claim 5 wherein B is a moiety of propylene.

7. The polymer of claim 6 wherein a portion of the monomeric units contain dimethyl ketal moieties.

8. The polymer of claim 2 wherein said alpha-olefin has up to 20 carbon atoms inclusive.

9. The polymer of claim 1 having a molecular weight of 1,000 to about 200,000 and a melting point of about 175° C. to about 300° C.

10. The polymer of claim 1 wherein said monomeric unit purity is determined by $^{13}$C-NMR methods.

11. The polymer of claim 1 having enhanced crystallinity.

* * * * *